Dec. 6, 1938.  P. P. BRUDER  2,139,353
ELECTRIC LAWN EDGE TRIMMER
Filed Sept. 24, 1937
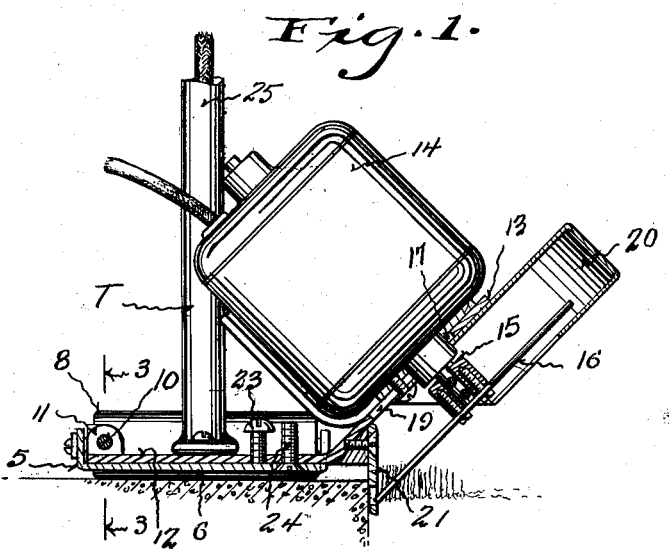
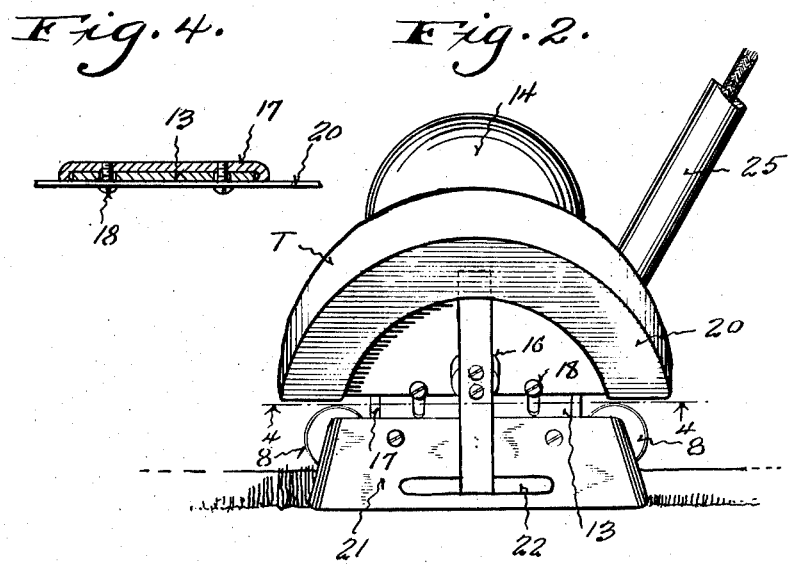
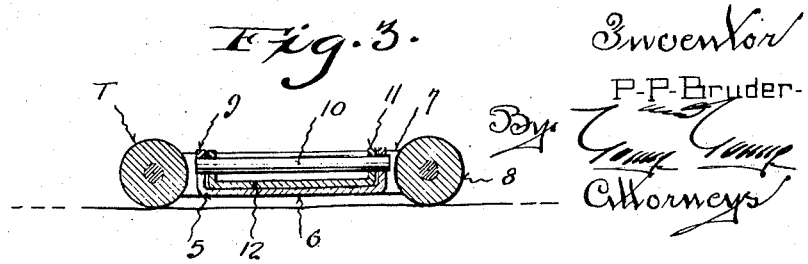
Inventor
P-P-Bruder-
By
Attorneys Patented Dec. 6, 1938

2,139,353

UNITED STATES PATENT OFFICE 2,139,353

ELECTRIC LAWN EDGE TRIMMER

Peter P. Bruder, Wauwatosa, Wis.

Application September 24, 1937, Serial No. 165,523

1 Claim. (Cl. 30—276)

This invention appertains to novel devices for trimming the edges of lawns.

Great difficulty is often experienced in trimming the edges of lawns adjacent to concrete and other sidewalks. This is particularly true, however, if the lawn borders the sidewalk for any great distance. It is, therefore, one of the primary objects of my invention to provide a novel machine, which can be manually pushed over a sidewalk having a power-driven cutter for extending over and cutting the edge of the lawn.

Another salient object of my invention is to provide a portable lawn edge-trimmer, having a novel guide plate for engaging the marginal edge of the sidewalk, whereby the attachment will be guided and held in the desired relation to the lawn border during the pushing of the machine over the sidewalk.

A further important object of my invention is to provide a lawn edge-trimmer embodying a carriage having a pair of spaced rollers for engaging the sidewalk, and a plate hingedly mounted upon the carriage carrying the motor and cutter, with means for adjusting the angular position of the plate relative to the carriage, whereby the position of the cutter relative to the lawn can be varied.

A further important object of my invention is the provision of means for bodily shifting the motor and cutter on the plate, whereby the depth of the cut of the lawn edge can be regulated.

A still further object of my invention is to provide a lawn edge-trimmer of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a vertical central section through the edge-trimmer, showing the same in use, a part of the operating handle being shown broken away.

Figure 2 is a front elevational view of the improved trimmer, with a part of the handle broken away.

Figure 3 is a detail, vertical section through the traveling carriage, taken substantially on the line 3—3 of Figure 1, looking in the direction of the arrows.

Figure 4 is a detail, sectional view through the holding plate for the electric motor, the view being taken substantially on the line 4—4 of Figure 2, looking in the direction of the arrows.

Referring to the drawing in detail, wherein similar reference characters designate corresponding parts throughout the several views, the letter T generally indicates my improved lawn edge-trimmer, and the same includes a base carriage 5, which is adapted to be manually pushed over a sidewalk adjacent to the edge of the lawn which is to be trimmed. The base carriage 5 includes a base plate 6, having extending laterally from the opposite ends thereof pivot ears 7, which form journals for rollers 8 which engage the walk. The base plate 6 also has formed thereon between the rollers 8 upstanding pivot ears 9 for receiving the pivot pin 10, which also extends through ears 11 formed on the adjustment plate 12. By providing the pin 10 the adjusting plate 12 can be swung on the carriage. The forward edge of the adjustment plate 12 carries an angularly disposed extension 13 on which is shiftably mounted the electric drive motor 14. The drive motor 14 is provided with an armature shaft 15, which extends through a slot in the extension 13. The outer end of the armature shaft has secured thereto in any desired manner a double-armed knife 16, which is utilized for trimming the lawn edge.

The casing of the motor 14 has rigidly secured thereto in any preferred manner an attaching plate 17, which rests over the extension 13. Holding screws 18 extend through slots 19 in the extension 13, and engage the attaching plate 17 for holding the motor in the desired position. A guard 20 can be provided for the rotating knife 16, and this guard can be secured in position on the extension 13 by the screws 18.

Rigidly secured to the extension 13 of the adjustment plate is a depending guide plate 21. This guide plate 21 can be slotted as at 22 to permit the passage of the ends of the knife blade 16 past the same.

As heretofore stated, the adjustment plate 12 can be swung on the carriage, and this adjustment plate can be held in any desired position by the use of screws 23 carried by said adjustment plate. These screws are adapted to bear against the upper surface of the base plate of the carriage. After adjustment of the plate 12, the same can be held against upward movement by screws 24, which extend through the base plate into threaded engagement with the adjustment plate.

The adjustment plate carriage has rigidly bolted thereto an operating handle 25, and this handle preferably extends at an angle upwardly from the carriage at a suitable distance within convenient reach of the operator. The outer end of the handle can be formed in any desired manner to provide suitable hand-grips, and a switch can be mounted upon the handle for controlling the flow of current to the motor.

It is proposed to lead the electric wires for the motor through the handle, and the wires can terminate in a plug for connection with a suitable house-wired socket.

In use of my improved edge-trimmer, the same is placed on the sidewalk with the guide plate 21 in engagement with the marginal edge of the walk adjacent to the lawn, with the rotatable knife 16 extended over the lawn at an angle thereto. The plate 12 can now be adjusted to position the knife best suited for the lawn, and the motor 14 can also be shifted so as to raise or lower the knife as may be preferred. The motor 14 is now set in operation, and the operator pushes the carriage along the sidewalk by means of the handle 25. As the machine is pushed along the sidewalk, the rapidly rotating knife will cleanly cut and trim the lawn edge without any difficulty on the part of the operator.

Obviously, when the knife 16 is worn, it is necessary to adjust the same up and down relative to the cut as mentioned in connection with the raising and lowering elements. Furthermore, the adjustment of the depth of the cut is varied up or down by raising and lowering the screws 23 and 24.

Changes in details may be made without departing from the spirit or the scope of my invention, but what I claim as new is:

A lawn edge trimmer comprising, a carriage having a base plate, transversely extending rollers rotatably carried by the base plate at the opposite ends thereof, an adjustable plate hingedly secured at its outer edge to the outer edge of the base plate between said rollers, said adjusting plate normally resting on the upper surface of the base plate, means for holding the adjusting plate in different angular positions relative to the base plate, an angular extension formed on the adjusting plate extending beyond the base plate, a motor adjustably mounted on the extension movable toward and away from the base plate, a cutting knife operatively connected to the motor, a depending guide plate secured to the extension for engaging the edge of a sidewalk adjacent the lawn to be trimmed, and a manipulating handle secured to adjusting plate.

PETER P. BRUDER.